UNITED STATES PATENT OFFICE.

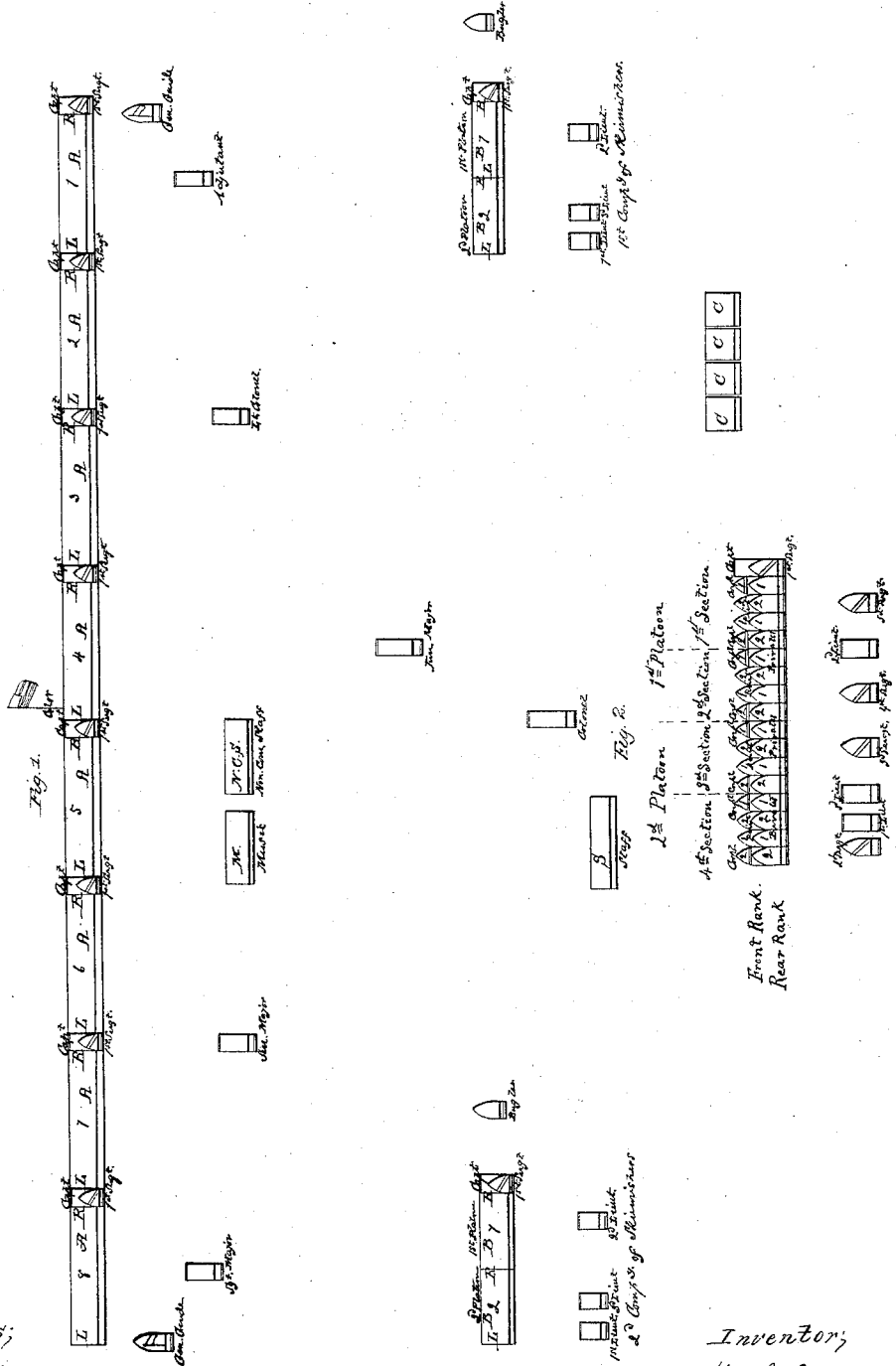

WILLIAM S. ENGLE, OF BROOKLYN, NEW YORK.

APPARATUS FOR TEACHING MILITARY TACTICS.

Specification forming part of Letters Patent No. 37,160, dated December 16, 1862.

*To all whom it may concern:*

Be it known that I, W. S. ENGLE, of Brooklyn, in the county of Kings and State of New York, have invented a new and Improved Mode of Teaching Field Exercises and Evolutions in Military Tactics; and I do hereby declare that the following is a full, clear, and exact description of the same, reference being had to the accompanying drawings, making a part of this specification, in which—

Figure 1 is a plan or top view of my invention, slightly in perspective, reprrsenting battalion drill; Fig. 2, a plan or top view of the s: m representing company drill.

Similar letters of reference indicate corresponding parts in the two figures.

This invention consists in the employment or use of military figures composed of rectangular blocks representing companies in line, and detached figures representing officers and privates, as hereinafter fully shown and described, whereby a learner may practice all the movements of the privates and officers, both in battalion and company drill.

To enable those skilled in the art to fully understand and construct my invention, I will proceed to describe it.

In battalion drill the several companies are represented by rectangular blocks A of wood or other material, the rear of the companies being designated by painting one side of the blocks black or some other color. These blocks are numbered 1, 2, 3, 4, 5, 6, 7, and 8, R representing the "proper right" and L the "proper left" of each company. The smaller blocks B, numbered 1 and 2, represent the first and second platoons of a company, and in battalion movements may be used for the two companies of skirmishers, as prescribed in Casey's tactics, and they may also be used for the school of the company, as occasion may require. In addition to these there are four blocks, C, smaller than B, and designed to represent the four sections of a company. The block marked S represents the staff, N C S, non-commissioned staff; M, music; D, color.

Besides these wooden blocks there are detached pieces, which may be of metal, the largest of which are of rectangular form and represent the following officers: The large blue piece, the colonel; red piece, lieutenant-colonel; white piece, senior and junior majors; green piece, adjutant and sergeant-majors.

The smaller rectangular pieces represent the following officers: Blue, captains (one for each company;) red, lieutenants, numbered 1, 2, and 3, for first, second, and third, (two of each for the skirmishing companies.)

Small pieces with rounded or pointed tops represent the following: Red, buglers; blue, (diagonal stripe,) sergeants, (Nos. 1, 2, 3, 5;) blue, (horizontal stripe,) corporals; blue, (small flag painted on front,) general guides; blue, (white backs), privates front rank; blue, (black backs,) privates rear rank.

The privates are numbered 1 and 2, front and rear rank, from right to left, intended for company drill, and in battalion may represent first and second sergeants, the blue side designating the front.

In Fig. 1 the battalion is drawn up in line of battle, and the officers are all placed in proper position.

It will be seen from the above description of the pieces that the learner may execute all the movements of either battalion or company drill from Casey's tactics, and soon make himself master of the exercises and evolutions.

Having thus described my invention, what I claim as new, and desire to secure by Letters Patent, is—

The employment or use of the military figures or pieces representing privates and officers pertaining to a battalion or regiment, for the purpose herein specified.

WM. S. ENGLE.

Witnesses:
M. M. LIVINGSTON,
M. S. PARTRIDGE.